United States Patent [19]

Johnson

[11] Patent Number: 4,526,615

[45] Date of Patent: Jul. 2, 1985

[54] CELLULAR HEAP LEACH PROCESS AND APPARATUS

[76] Inventor: Paul H. Johnson, P.O. Box 31, McIntosh, N. Mex. 87032

[21] Appl. No.: 696,842

[22] Filed: Jan. 29, 1985

Related U.S. Application Data

[63] Continuation of Ser. No. 471,033, Mar. 1, 1983.

[51] Int. Cl.$^3$ .............................................. C22B 1/00
[52] U.S. Cl. .................................... 75/101 R; 75/116; 75/117; 75/120; 75/121; 75/118 R; 75/119; 423/27; 423/98; 423/109; 423/139; 423/150; 405/129; 299/5
[58] Field of Search .................... 423/27, 98, 109, 150, 423/131; 75/101 R, 116, 117, 120, 121, 118 R, 119; 299/5; 405/128, 129

[56] References Cited

U.S. PATENT DOCUMENTS

| | | | |
|---|---|---|---|
| 1,032,400 | 7/1912 | Gunther | 423/150 |
| 1,559,934 | 11/1925 | Bosch | 299/5 |
| 1,890,934 | 12/1932 | Carson | 423/150 |
| 4,017,309 | 4/1977 | Johnson | 75/101 R |

OTHER PUBLICATIONS

"Heap Leaching Is Small Miner's Golden Opportunity", Kappes, D. W., *Mining Engineering*, pp. 135–140, (Feb. 1979).
"Cu/U Ore-Leaching Route Cuts Pollution, Trims Costs", Parkinson, Gerold, *Chemical Engineering*, Apr. 24, 1978 (reprint).
"Pretreatment and Stabilization of the Naturita Tailing Pile Using Heap Techniques", Scheffel, R. E. (paper).

*Primary Examiner*—John Doll
*Assistant Examiner*—Robert L. Stoll
*Attorney, Agent, or Firm*—Workman, Nydegger & Jensen

[57] ABSTRACT

The present invention is directed to heap leach processes for leaching metal values from ore. The heap is constructed with a plurality of cellular heaps formed by loading ore onto an impermeable pad having a raised berm network thereon to separate the pad surface into a plurality of reservoirs. Leach solution percolating through the ore is collected in the respective reservoirs. Additional cellular heaps may be subsequently built overlying the original cellular heaps with an impermeable barrier being placed between stacked cellular heaps to prevent overleaching of underlying cellular heaps. The effluent leach solution from the overlying cellular heap is routed to the underlying reservoir from where it is withdrawn. Use of berms on the surface of the individual cellular heaps permits pooling of leach solution thereon for enhanced leaching. An earthen dam around the heap eliminates ore sides to the heap and insulates the heap during cold weather. Leach solution is recirculated through the various cellular heaps and a countercurrent-type leach cycle results in the continuous production of extremely concentrated solution to the recovery facility and results in uniform leaching of the ore. A pad is provided with an underlying compartmentalized monitor system which permits containment of solutions leaking through the pad, and which allows for identification of the location of the leak so that the leaking portion of the pad may be sealed off or repaired.

12 Claims, 13 Drawing Figures

CELLULAR HEAP LEACH PROCESS AND APPARATUS

This application is a continuation of U.S. application Ser. No. 471,033, filed Mar. 1, 1983, for Cellular Heap Leach Process and Apparatus.

BACKGROUND

1. Field of the Invention

The present invention is generally related to methods for leaching metal-bearing ores for the recovery of desirable metal values. More particularly, the present invention is directed to the leaching of such ores by improved heap leaching processes and improved heap construction.

2. The Prior Art

Desirable metals (such as gold, silver, copper, aluminum, uranium, and the like) are generally found as mineral constituents in naturally occurring ores. The most common method of separating the desirable metal values from the remaining undesirable constituents, often called the "gangue," is by chemical leaching of the ore, wherein ground or crushed ore is subjected to treatment with chemical solutions containing reagents capable of selectively solubilizing the desired metal constituents while leaving the gangue material intact. The leach solution is then treated in recovery and refining operations to obtain the metal values in a purified form.

The actual mechanism of leaching may involve simple dissolution made possible by administration of a suitable solvent, or, more commonly, involves dissolution made possible by a chemical reaction. The efficiency and rate of leaching depends upon many factors, including the rate at which the leach solution is administered, the amount of metal in the ore, and the conduciveness of the ore to leaching.

Some ores are quite permeable to leach solutions; hence, relatively large ore particles can be effectively leached. Many ores are, however, rather impermeable; as a result, the ore must be reduced to a small size before leaching in order to increase the surface area of the ore and to decrease the requirement for the leach solution to penetrate deeply into the ore particles.

Various methods of leaching metal ores have been developed, including the methods known as waste dump leaching, heap leaching, vat leaching, agitation leaching, and most recently, thin layer leaching.

Because of its gross inefficiency "waste dump" leaching has been used principally in connection with low-grade copper ores or pit wastes. The waste dump leaching method consists of stacking uncrushed ore into large, deep heaps (for example, 50 to 200 feet in depth) and percolating an acid and ferric sulfate leach liquor through the heaps so as to dissolve copper sulfide. The primary advantage of waste dump leaching is its low cost, which makes this method commercially feasible for use with low-grade ores despite its inefficiency in recovering the metal values from the ore. However, the inefficiency of the waste dump method makes it entirely unsuitable for use with higher-grade ores.

"Heap" leaching is a term used to describe a leaching process in which the ores are placed onto what is commonly known as a "pad." Generally, the pad consists of impermeable clay, and the crushed ore to be leached is stacked on the pad to a depth of between about 12 and about 30 feet. The ore is then leached by spraying a leach solution onto the top of the heap in order to create a downward percolation of the leach solution.

When leaching by percolation, the size of the ore particles is very important. If the particles are too large, the leach solution will not penetrate to the interior of the particles, and leaching is thus incomplete. Further, use of large particles typically results in a rapid percolation rate, thereby causing leach solution to pass through the heap too quickly. On the other hand, if the particles are too small, although the ore will be effectively penetrated by the leach solution, the percolation rate may become so slow as to be impractical.

The solution for dealing with particles that are too large for effective leaching is simply to reduce them in size. Conversely, undersize particles may be "agglomerated," such as by the addition of portland cement, in order to increase the percolation rate through the heap.

One serious problem that has plagued conventional heap leach processes is the difficulty in obtaining a uniform leach throughout the heap. Typically, the upper layer ore in such a heap is over-leached while the lower layer ore is inadequately leached.

Yet another problem when using a heap leach process is the difficulty in leaching the sides of the heap, especially when the heap consists of ores having low permeabilities or fine ores that are easily eroded. When leaching these types of ores, there is a tendency for the leach solution to run down the side of the heap rather than percolate through the heap.

In a heap leaching process, while the leach solution effluent is relatively rich in metal values initially, it often becomes quite weak as leaching continues over a period of weeks or months. This is particularly significant when it is realized that heaps of the type described above are typically leached for somewhere between a month and a year. The recovery facilities must be constructed so as to be capable of handling the relatively rich solutions obtained initially, even though this means that the recovery facilities are underutilized during the later period of time when the leach solutions become less concentrated with metal values.

After the ore has been leached to the maximum extent economically possible, there is the further problem of what to do with the tailings. One solution has been to leave the tailings in the heap and construct a new pad for additional recovery operations. However, in order to avoid building a multiplicity of pads, it is not uncommon to reuse a pad and to remove the tailings to a waste heap. Generally, when a pad is to be reused, relatively easily leached ore is heaped to a depth of only about 6 to 15 feet, and the heap is leached for a period of only about one to six weeks.

A different technique often used for leaching of ores, known as "vat leaching," typically involves the placing of crushed ore within a large concrete vat through which a leach solution is recirculated in an upward flow over a period of several days. Disadvantages of this method are that it is relatively expensive and also relatively inefficient. Because of these deficiencies, vat leach operations must be satisfied with recovering whatever metal values are leached in a few days, with the remaining metal values being discarded along with the tailings.

Agitation of the ore during leaching has been shown to significantly improve the recovery of metal values. Thus, another form of leaching, aptly termed "agitation leaching," is typically used for the leaching of high-grade ores wherein the substantially increased costs of this process are warranted. The agitation leaching technique typically involves the mechanical agitation of a slurry of very fine ore particles. This technique is extremely expensive in terms of capital and operating costs. First, the ore must be comminuted to a very small size before it will be efficiently leached in the short period of leaching utilized in this process. Additionally, the energy costs of agitating the slurry of ore particles are quite substantial. Nevertheless, because of its higher efficiency in terms of metal value recovery, this technique is often used on a commercial scale with high-grade ores.

Recently, another process for leaching ores, termed thin-layer leaching, has been developed. This process, which is described in U.S. Pat. No. 4,017,309, generally involves placing an acid-cured crushed copper or uranium ore onto a pad having a porous substrate. Unlike other heap leaching techniques, this technique involves placing the ore into a relatively thin layer (for example, less than two meters) and leaching the layer for a relatively short period of time (generally less than two weeks). Leach solutions are optimally routed to and from a number of pads so as to provide distinct stages of leaching and rinsing of the ores with leach solutions containing varying concentrations of reagent.

The thin-layer process has proven relatively effective in leaching many copper and uranium ores and permits a moderate reagent usage in comparison to the recovery of metal values. However, it has been found disadvantageous for use with slow-dissolving ores because of the small volume of ore processed in such a thin heap and the high costs of building pads for use in connection with this technique. This has substantially limited the use of the thin-layer process with ores containing gold and silver. It has also proven uneconomical for leaching ores containing primary uranium minerals or for leaching sulfide copper ores.

A disadvantage common to most of the foregoing leaching processes is the need for double-handling of the ore. Thus, the ore must be handled once when it is loaded onto a heap or into a vat, and it must be handled a second time when the ore is removed to a tailings waste pile.

Another disadvantage encountered when using one of the heap leaching processes is that leach solutions sometimes freeze during the winter months. As the leach solution is sprayed onto the top of the heap, the spray freezes, thereby shutting down the operation until the arrival of warmer weather. Even where freezing does not occur, low temperatures adversely affect the reaction rate of the leaching process. In many geographical areas, cold temperatures can result in a substantial nonproductive period. These problems of freezing and reduction of reaction rates have been alleviated somewhat by heating the leach solutions, but such an approach is expensive and has not proven entirely acceptable because the heat is dissipated rapidly as the solution is sprayed onto the heap.

From the foregoing, it will be appreciated that it would be a significant advancement in the art of leaching ores for the recovery of metal values to provide a process capable of use with a large variety of ores having differing characteristics of permeability, size, and leach characteristics. It would also be a significant advancement if a heap leaching process were to be provided that could obtain high concentrations of metal values in the leach solution, and maintain such concentrations relatively constantly, so as to allow optimum use of recovery facilities. It would be a further significant advancement in the art if heap leaching processes could be provided that was capable of low cost operation and would avoid the disadvantages presently encountered with side erosion of the heap, with wintertime operation, and with multiple handling of the ore.

BRIEF SUMMARY AND OBJECTS OF THE INVENTION

The present invention is directed to novel heap leach processes and novel heap constructions which permit improved recovery of metal values from metal-bearing ores at relatively low costs of construction and operation.

The heap construction comprises a multiplicity of heaps, each of which may be leached separately, yet which are loaded onto a single pad and may even be contiguous to each other. Thus, a plurality of cellular heaps are formed by loading ore onto a pad which has been provided with a berm or wall network that serves to separate the surface of the pad into a plurality of individual reservoirs.

In one embodiment, the leach solution percolating downwardly from ore stacked onto the pad is collected in the respective reservoir therebelow, thereby effectively compartmentalizing the heap of ore into cellular heaps, or "cells," even though there may actually be no physical barrier between adjacent cells. In another embodiment, the walls of each reservoir are of sufficient height that a physical barrier between adjacent cells is formed.

Importantly, this approach also permits ore to be left permanently in place on the heap, while yet providing for leaching of additional ore. This is accomplished by sealing off the first layer of cellular heaps after leaching, and building a second layer of cellular heaps over the first layer. It is possible to build a number of overlying layers without building a new pad for the entire heap.

Preferably, the individual cells are leached by pooling leach solution within berms formed around the periphery of the various cells. This allows for much more uniform leaching than occurs as a result of the conventional practice of sprinkling leach solution onto the surface of the heap. In addition, this process also decreases heat losses so that winter-time operation becomes more feasible.

It is preferred that the height of the cellular heap be limited to the height at which the particular ore being leached can be effectively leached at both the top and bottom of the cellular heap, and where lateral dispersion of leach solution during percolation is not so serious a problem that a substantial portion of downwardly percolating leach solution escapes to adjacent cells.

A feature of the present invention is the use of an earthen dam around the periphery of the heap. Preferably this dam is substantially a right triangle in cross-section such that the hypotenuse serves as the outside wall of the dam, and the vertical side of the dam serves as the inside wall against which the ore is loaded. This arrangement eliminates the ore sides of a conventional heap, thereby eliminating the requirement to leach the sides of the heap and the resulting problems of erosion. Importantly, with the intensive leaching contemplated in the practice of the present invention, fine ores will tend to become somewhat fluid; use of the earthen dam will provide structural integrity to the heap. The earthen dam also insulates the heap during cold weather and protects the heap from freezing temperatures.

Another feature of the present invention is the use of a permanent pad having a system of monitor pipes under the pad for detecting leaks. Such a system makes it possible to repair a leaky pad by indicating the specific location of any such leaks. The pad is preferably constructed by installing an impermeable barrier capable of preventing leach solution from draining into the environment in the event of a pad leak, and by forming a plurality of reservoirs into which perforated monitor pipes are placed so that the monitor pipes are extended to the exterior of the heap for withdrawing any solution collected from a leak. A second impermeable barrier is then installed over the monitor system to serve as support for the heap.

The heap of the present invention permits the use of an improved process for leaching the ore because of the ability to administer leach solution selectively to the various cells, and also to remove effluent selectively from the cells. This makes possible a leach cycle involving separate leach stages. Moreover, countercurrent leaching concepts can be applied in order to obtain an effluent solution having a relatively constant and high metal value concentration. The use of concentrated leach solutions further diminishes problems of freezing in cold weather because the presence of salts significantly reduces the freezing temperature of the solution.

It is, therefore, a primary object of the present invention to provide for the improved recovery of metal values from a variety of ores having differing characteristics of permeability, size, and leach characteristics.

It is also an object of the present invention to obtain a relatively constant flow of effluent leach solution having a high metal value concentration.

Yet another object of the present invention is to provide an improved heap construction that overcomes the difficulties encountered in connection with present heaps where the sides of the heap are subject to erosion.

Yet another object of the present invention is to provide an improved heap leach system capable of low operating costs while insuring uniform leaching.

Still further objects of the present invention are to provide a heap capable of winter-time operation without the difficulties inherent in conventional systems, and to avoid the requirement for multiple handling of the ore while still being capable of efficient recovery.

Yet a further object of the present invention is to provide a heap capable of operation without posing a hazard to the environment.

These and other objects of the present invention will become more fully apparent in view of the following detailed description, the accompanying drawings, and the appended claims.

DETAILED DESCRIPTION OF THE INVENTION

Figure 1:
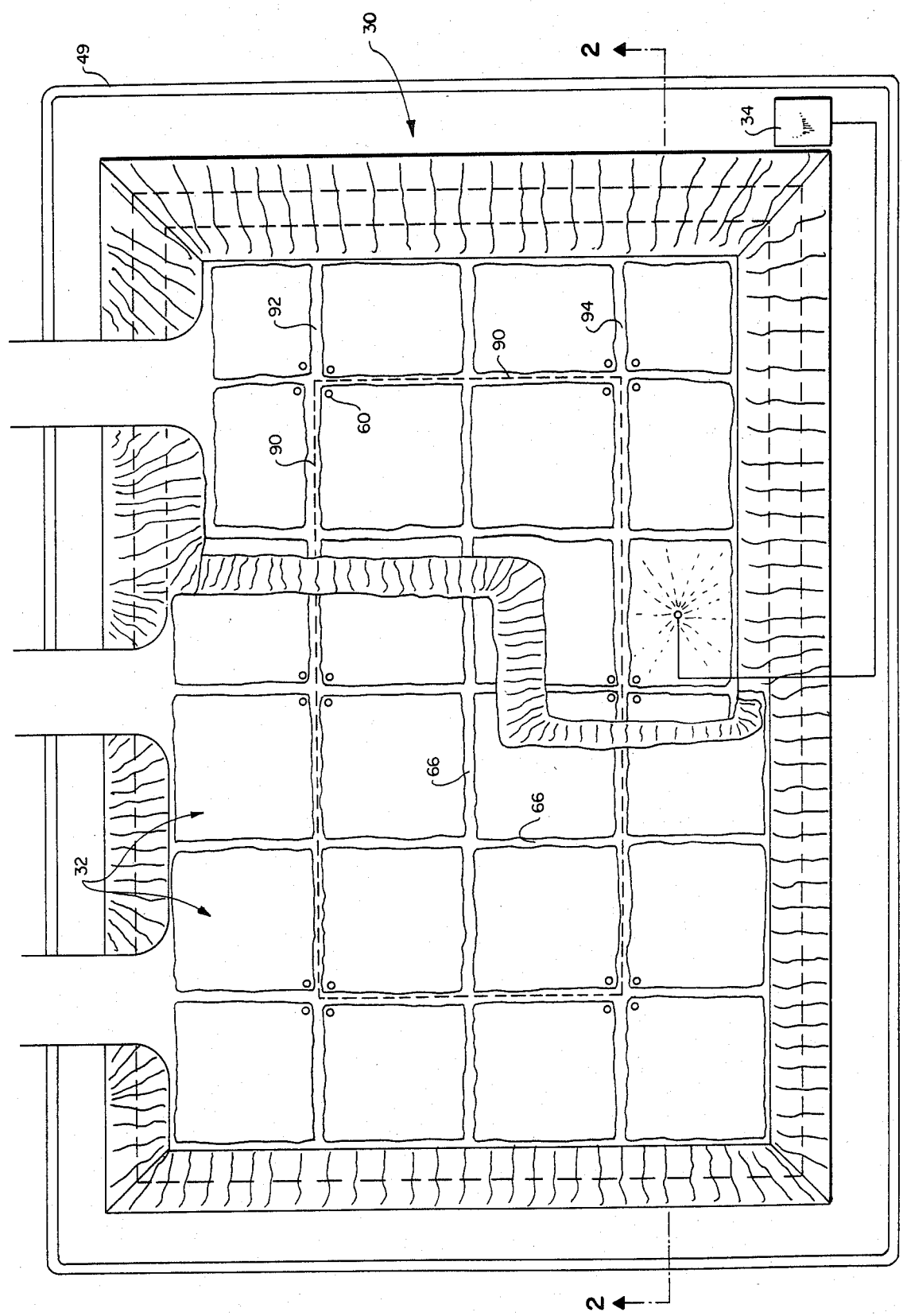
FIG. 1 is a top plan view of a typical cellular heap leach installation which is within the scope of the present invention.
Figure 2:
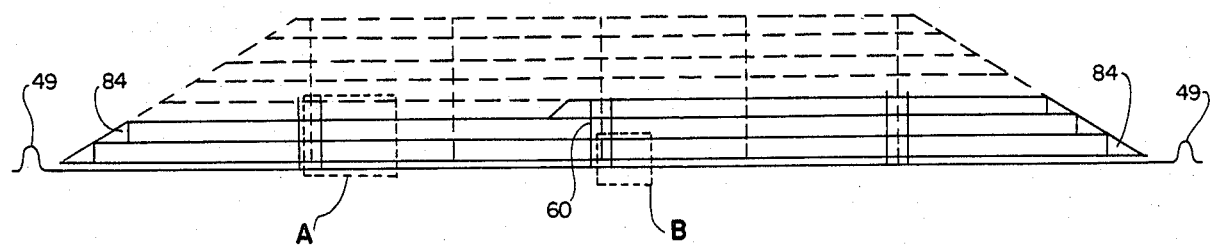
FIG. 2 is a vertical cross-sectional view of a typical cellular heap leach installation within the scope of the present invention, as taken along line 2—2 of FIG. 1.

The present invention may best be understood by reference to the drawings wherein like elements are represented by like numerals. FIGS. 1 and 2 illustrate a typical leaching installation 30 constructed in accordance with the present invention. Installation 30 includes a number of individual cellular heaps or cells 32 aggregated together so as to form a large heap. As best seen in FIG. 2, various cells are also built on top of existing cells in the course of building the overall heap system.

An important feature of the invention is that each cell may be leached independently of the other cells; yet, because of the ability to utilize multiple layers of cells, there is a minimal need for building new pads. Because of the design of construction, leach solution obtained from the various cells may be recirculated (as will be discussed in greater detail below) or may be sent directly to a recovery facility 34 for removal of the metal values and contaminants.

Figure 3:
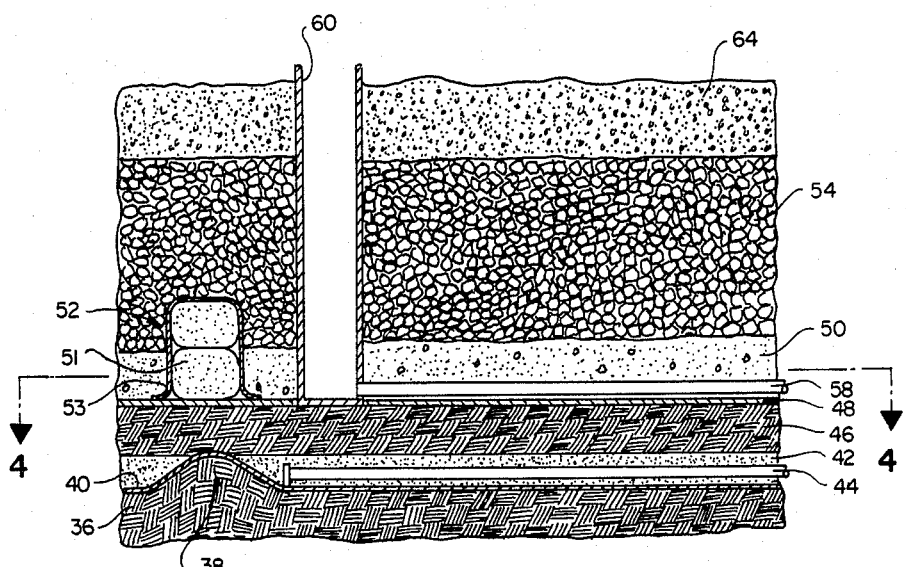
FIG. 3 is an enlarged vertical cross-sectional view of the pad and the reservoir system of a heap within the scope of the present invention indicated by line B of FIG. 2.

Because of environmental concerns, it is preferred that the heap system be placed on a pad constructed in a manner that will prevent the leach solution from seeping into ground water. One preferred embodiment of such a pad is illustrated in FIG. 3. There, it is seen that the pad is advantageously constructed by forming an underlying compacted soil layer 36 having a number of ridges 38 which outline a raised grid network corresponding to the dimensions of the cells to be formed. Each grid effectively becomes a separate reservoir.

An impervious liner 40 (such as a six mil (0.006 inch) thickness of polyvinyl chloride or chlorinated polyethylene plastic sheet material or other suitable material) is advantageously placed over the compacted soil layer and then covered by a layer of coarse sand 42, preferably about three (3) to six (6) inches in thickness. A separate perforated monitor pipe 44 is embedded within this sand layer for each compartment, and the monitor pipe is connected to an unperforated pipe (not shown) that extends to the exterior of the pad. This construction allows each reservoir to be individually monitored for leakage. In the event that leakage into sand layer 42 does occur, impervious liner 40 will prevent leakage into the environment until the overlying area of the pad can be repaired or sealed.

Another compacted soil layer 46 is then advantageously provided to serve as a level base for the overlying portions of the pad and the heap. If desired, this layer may be bentonite clay or some other impermeable material to further insure against leakage. Sand and soil layers 42 and 46, respectively, are then sealed from the overlying portions of the heap by means of impervious layer 48, which may be formed in a number of ways, depending upon the degree of protection required. Impervious layer 48 may be formed of one or more layers of plastic sheeting, or it may be formed of a sealed asphalt layer covered by plastic if even a greater protection is desired. To further protect against leaks occurring from the sides of the heap it is advantageous to provide the pad with an outside peripheral berm 49. If desired, the area between outside berm 49 and the heap may be used as a leach solution storage area.

An important feature of the invention is the use of individual cellular reservoirs to collect effluent leach solution from the individual cellular heaps. Preferably, the individual reservoirs will have sufficient capacity to contain all of the leach solutions percolating through the overlying heap in the event that equipment removing solution from the reservoir fails or is shut down.

A presently preferred construction of such a reservoir is illustrated in FIG. 3, where it is seen that a layer 50 of permeable sand and rock capable of holding solution interstitially is placed onto impervious layer 48 of the pad. Layer 50 is separated into reservoirs corresponding to the underlying reservoirs of the pad monitor system by means of cloth or plastic bags 51 filled with soil which are stacked so as to form berms 52. It may also prove advantageous to cover bags 51 with a layer of plastic sheeting 53 when cloth bags are used in order to further insure that leach solution within the various reservoirs are maintained separately. An additional layer 54 of relatively permeable ore or coarse rock may optionally be added onto permeable layer 50 so that loading equipment may be operated on top of the heap without causing damage to the base of the pad or to the effluent recovery system described below. Further, use of the permeable layer 54 will increase the capacity of the heap to serve as a storage reservoir for leach solution.

Figure 4:
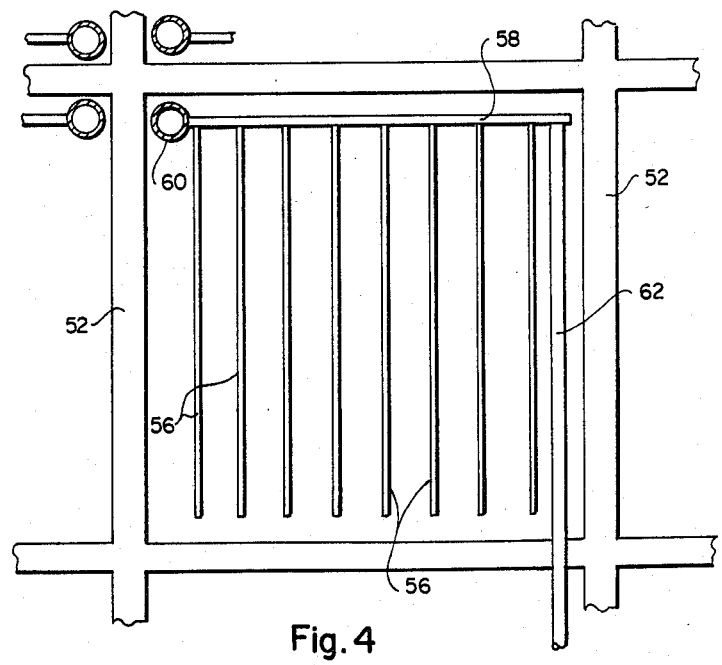
FIG. 4 is a horizontal cross-sectional view of a reservoir effluent recovery system within the scope of the present invention as taken along line 4—4 of FIG. 3 and drawn to a somewhat reduced scale.

As best illustrated in FIG. 4, a system of pipes serving as an effluent leach solution recovery system is advantageously placed along the base of permeable layer 50. This pipe network is constructed by laying a number of perforated pipes 56 in parallel relationship to one another and then connecting them to a common collection pipe 58. Also connected to the collection pipe, for reasons that will become more apparent hereinafter, is a vertical standpipe 60 that extends above the level of the heap. Finally, a drain line 62 is connected to the collection pipe for removing solution from collection pipe 58 and permeable layer 50 to the outside of the heap. For purposes of clarity, the various pipes used for administering and removing leach solution are omitted from many of the figures. However, it will readily be appreciated what pipes will be necessary in order to practice the present invention.

Overlying the reservoir of FIG. 3 is a layer of ore 64 which has been prepared for leaching. With very permeable ores, it may be possible to leach run-of-mine ores with little or no preparation. However, with most ores, it will prove beneficial to crush or grind the ore to a fine particle size and then agglomerate these particles with cement. With some ores, it will also be advantageous to mix the ore particles with clays or fines or to place fine fractions of the ore on the top of ore layer 64 to adjust the percolation rate of leach solution through the ore. It may also be desirable to mix various chemical compounds with the ore so as to alter pH, or otherwise assist the leaching process.

Thus, it should be understood that the present invention may be advantageously used with virtually any leachable ore and that it may also be used with a variety of particle sizes.

The order in which the heap is built will be determined by the grid network originally established by soil ridges 38 and reservoir berms 52. Thus, the general construction procedure is to load ore onto an area corresponding to one of the reservoirs formed on the pad by berms 52 (and a little bit beyond so as to provide for heap integrity), and then forming a berm 66 along the surface of the ore layer in a pattern and position corresponding to the underlying grid pattern, thereby forming a cellular heap, or a "cell." It is desired that care be taken as the ore layer is built to insure that vertical standpipe 60 is extended sufficiently that it will always extend above the level of the heap in order to prevent ore from falling into the standpipe.

The appropriate number, size, and depth of cellular heaps in the overall heap system is most advantageously determined experimentally (in light of the considerations discussed below) prior to construction of the heap, and depends upon the particular characteristics of the ore which is to be leached. Based upon these experiments, the optimum particle size may also be determined and decisions may be made as to the advisability of agglomerating the ore, or mixing clays or fines with the ore to adjust the percolation rate. It has been found that the process of the present invention is most effective when used in connection with finely ground, cement-agglomerated ores high in clays or fines, in contrast to conventional heap leach processes which typically require larger particles. However, even when using the large ores of conventional heap leach processes, the present invention is more efficient and more economical then conventional processes because of the intensive and uniform nature of the leaching.

Preferably, the individual cells are subjected to intense recirculation of leach solutions in several stages so as to optimize recovery of metal values while minimizing use of reagents and operating costs. Depending upon the particular ore being leached, the first leach stage, which will typically recover from sixty to ninety percent (60-90%) of the metal values, will generally be accomplished in about one (1) to four (4) days. Subsequent leach stages may require a cumulative total of as much as 150 days to reach the point where it is no longer economically feasible to continue leaching because operation costs approach or exceed the value of the metals recovered.

Each cellular heap will typically be sealed off after completing the leach cycle to avoid overleaching ore that has already been leached to the maximum extent economically feasible. Accordingly, the minimum number of cellular heaps required for efficient and continuous operation may be calculated by comparing the number of days necessary to complete the first leach stage with the total number of days that a cell will be leached before it is sealed.

For example, if a particular ore requires three (3) days to complete the first leach stage and must be leached for a total of ninety (90) days before being sealed off, the heap will require thirty (30) active cells (90 divided by 3), assuming also that each cell will be loaded in the same number of days as are used to complete the first leach stage. Typically, this will be the case so that the loading process will be accomplished substantially continuously so as to make the most efficient use of the loading equipment. Of course, the overall size of the individual cellular heaps may be scaled upwardly or downwardly depending on the equipment used to load the cells and the capacity of recovery facility 34.

In addition to active cells, it is also necessary to provide several additional cells, so that some leached cells may be in the process of drying in preparation for the addition of an overlying cell. The number of additional cells needed will be a function of how quickly the particular ore dries sufficiently so that it will bear the weight of loading equipment used to build the overlying cell. Typically, some four to six extra cells will be needed in addition to the active cells.

In the presently preferred embodiments, the depth of each cell will typically be in the range of about five (5) to fifteen (15) feet. In order to avoid inefficiencies caused by overleaching some portions of the heap and by underleaching other portions, the ore should be stacked no higher that the height to which that particular ore can be leached to about the same extent at both the top of the layer and at the bottom of the layer. Another constraint upon the preferred depth of the cells is that the depth of each cell should be limited so as to minimize (to an acceptable level) the amount of lateral dispersion of downwardly percolating solution into adjacent cells. Of course, the type of loading apparatus used will impose another constraint upon the depth of the ore in the cells. It is anticipated that inexpensive front-end loaders or portable conveyor belts will typically be utilized for loading individual cells, and such equipment is generally incapable of loading a cell much higher than about twelve (12) feet.

On the other hand, for economic reasons it is best to make each cell as deep as possible so that a large amount of ore is leached in each cell. Because of these countervailing considerations, the optimum depth for the cells of a particular heap should generally be determined experimentally, and after taking into consideration each of the foregoing factors. Nevertheless, it is anticipated that most ores will be leached most efficiently by forming the cellular heaps about eight feet to ten feet deep (after settling), and this depth is a good starting point for experimentation.

Figure 5:
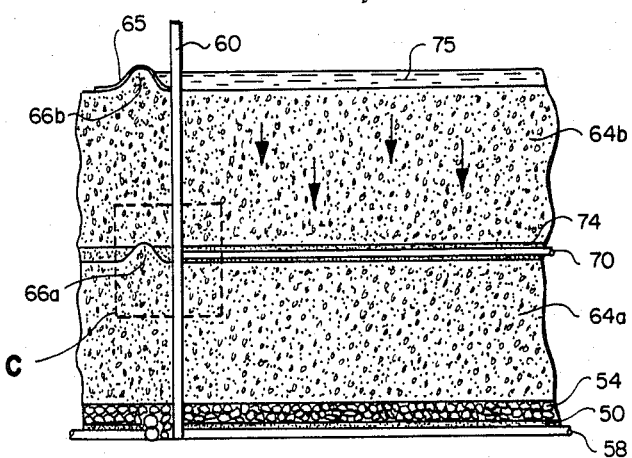
FIG. 5 is an enlarged vertical cross-sectional view of cellular heaps within the scope of the present invention indicated by line A of FIG. 2 in which the manner of construction of a cellular heap over a pre-existing cellular heap is illustrated.
Figures 6, 7:
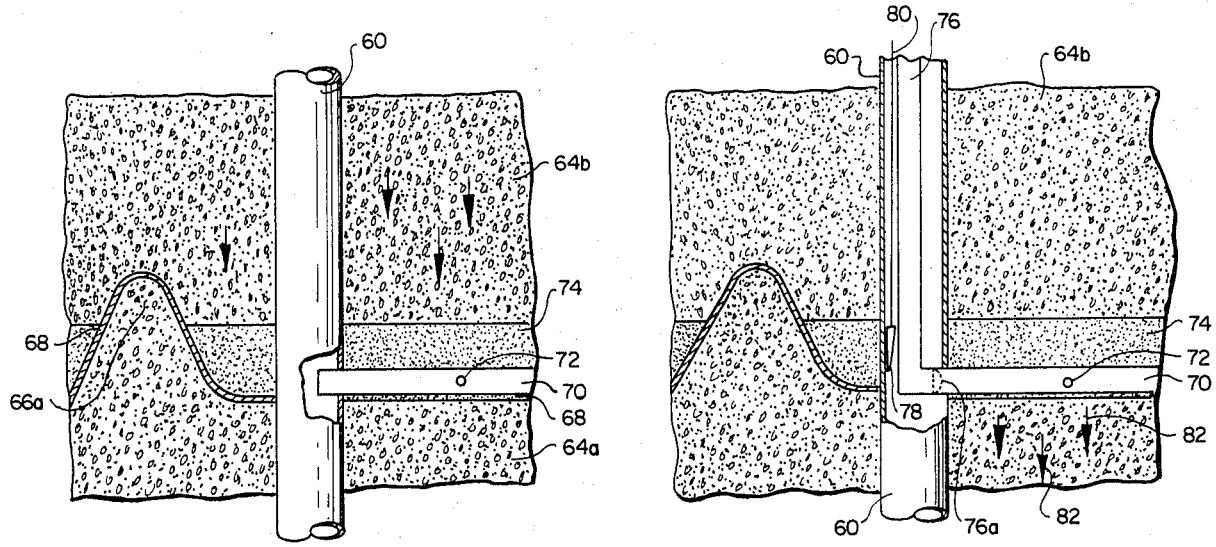
FIG. 6 is an enlarged vertical cross-sectional view of an effluent recovery system within the scope of the present invention indicated by line C of FIG. 5, which system may be utilized when a cellular heap is constructed over a preexisting cellular heap and the underlying cell has been sealed off from the overlying cell.
FIG. 7 is an enlarged vertical cross-sectional view similar to FIG. 6 except that the underlying cellular heap is illustrated as being leached despite the presence of an overlying cellular heap, with the leach solution being introduced at the bottom of the overlying cell.

FIGS. 5-7 illustrate the manner of construction of a heap leach system within the scope of the present invention wherein multiple layers of cells are constructed, yet wherein each active cell may be independently leached. FIG. 5 illustrates an area of the heap where two cells are stacked on top of a cellular reservoir of the general type illustrated in FIG. 3. Thus, in FIG. 5 it is seen that there is a vertical standpipe 60 connected to a collection pipe 58 that is placed within a layer 50 of permeable sand. A system of berms 52 separate permeable layers 50 and 54 into a number of individual cellular reservoirs. A layer of ore 64a is shown on top of semipermeable layer 54, this ore layer being identified as a discrete cell by means of berms 66a formed around the periphery thereof.

As best seen in FIG. 6, a leach solution collection system is provided between underlying ore layer 64a and overlying ore layer 64b. This collection system is advantageously constructed by laying down an impermeable barrier 68, which may be plastic or bentonitic clay, onto the top of the underlying ore layer so as to seal it off from further leaching. A collection pipe 70, similar to collection pipe 58 of the reservoir system, is connected to standpipe 60, and collection pipe 70 is also connected to a plurality of horizontal perforated pipes 72 corresponding in function to reservoir pipes 56. A permeable layer 74 of sand or the like is then placed over the effluent collection system comprised of barrier 68 and pipes 70 and 72 so that the leach solution will be evenly collected from overlying ore layer 64b.

Finally, the overlying ore layer 64b is constructed, and berms 66b are formed so as to delineate the overlying cell. In FIG. 5, a pool 75 of leach solution is also shown on top of ore layer 64b as being contained within berms 66b of the illustrated cell. Advantageously, a covering 65 of burlap or plastic may be placed over berms 66b to prevent erosion.

Because of the use of a pool of leach solution on the surface of the cell, the cell soon becomes saturated with leach solution, and leach solution begins percolating downwardly at a relatively constant rate. As the solution moves down to the level of barrier 68 (see FIG. 6), it will again begin to pool within permeable layer 74. Concurrently, the metal value bearing leach solution will seep into perforated pipes 72, from which it will flow into collection pipe 70, and then into standpipe 60. The solution flowing into standpipe 60 will fall to the bottom of the standpipe and from there it will flow into collection pipe 58 of the reservoir (see FIGS. 3 and 4).

In the reservoir, just the opposite effect will occur. As the solution flows into reservoir collection pipe 58, unless the solution is drawn off through drain line 62, the solution will flow out through perforated pipes 56 and will pool within permeable layers 50 and 54 of the reservoir system. Although it is anticipated that effluent solution will generally be drawn off about as fast as it enters collection pipe 58, this feature of the invention provides for under-heap storage of the leach solution in the event of mechanical breakdown and eliminates the need for external storage ponds. Samples may intermittently be withdrawn from the base of standpipe 60 to measure the concentration of leach chemicals, precious metals, pH, and the like.

The ability to utilize a pooled leach solution is an important feature of the present invention. One advantage of administering the leach solution by pooling rather than sprinkling is that pooling allows a large throughput of the solution through the heap, thus improving the uniformity of leaching by percolation and avoids problems of "channeling" that often occur when an ore is leached by sprinkling, where rivulets of leach solution tend to form in the heap so as to result in underleaching some portions of the heap. It has been discovered that percolation rates of about 0.3 to 2 gallons per hour per square foot to heap are easily obtainable when using pooled leach solutions, and that these percolation rates provide extremely uniform leaching.

Another advantage of using pooled leach solution is apparent during very cold weather. As mentioned above, it has proven difficult to operate a heap-type leaching facility during periods of cold weather when the leach solutions and heap freeze. Also, at reduced temperatures, the leach solutions become less effective as chemical reaction rates are slowed. Although this problem can be overcome by heating the leach solution, the conventional practice of spraying the leach solution onto the top of the heap has often resulted in the loss of so much heat as to make this practice economically impractical.

Use of pooling, however, significantly decreases the amount of heat lost, thus permitting the system to be operated in much colder atmospheric temperatures. Further, the present invention allows for the use of an insulating barrier (not shown) which can be floated on top of the pool of leach solution in order to further decrease heat losses. Another advantage of pooling is that it avoids wind-carried losses of leach solution that may pose a hazard to the environment.

Another approach within the scope of the present invention that may be utilized during winter-time operations is shown in FIG. 7. There it is seen that the impenetrable barrier 68 of FIG. 6 may be omitted, and a feed pipe 76 may be inserted into the open end of collection pipe 70. This insertion may be advantageously accomplished by providing a tapered fitting 76a on the end of pipe 76 so as to aid in insertion thereof, and placing a wedge 78 between the wall of standpipe 60 and pipe 76 so as to hold pipe 76 in place. Advantageously, a cable 80 is secured to wedge 78 so that the wedge may be subsequently removed.

When using this arrangement, leach solution is introduced into collection pipe 70 through feed pipe 76, from where it flows out through perforated pipes 72 into the surrounding permeable layer. The solution then percolates downwardly, as indicated by arrows 82. This approach avoids difficulties of winter-time operation by using the overlying cell 64b as an insulating barrier.

It will be appreciated that it would also be possible to omit impermeable barrier 68 from the cellular heap of FIG. 6 so that leach solution percolating down through overlying ore layer 64b would continue percolating down through underlying ore layer 64a. This approach might be a method of choice where very long leach periods are necessary.

Moreover, at some time in the future when it is finally desired to seal off the underlying ore layer, a slurry of bentonitic clay may be introduced down a feed pipe 76 in the manner shown in FIG. 7 in order to form an impermeable barrier 68 on the top of the underlying ore layer.

From the foregoing, it will be appreciated that significant advantages are realized when leaching by pooling rather than sprinkling. While pooling has not been practical heretofore because pooling is not effective for leaching the sides of a heap, the present invention avoids this difficulty by eliminating sides which need to be leached.

Figure 8:
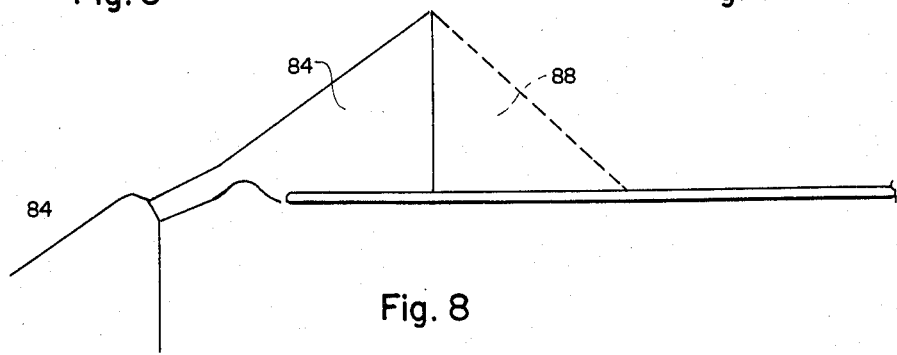
FIG. 8 is a vertical cross-sectional view of a triangular dirt dam used to contain a heap within the scope of the present invention, the dotted portion indicating a portion of the dam excavated away prior to loading the ore.
Figure 9:
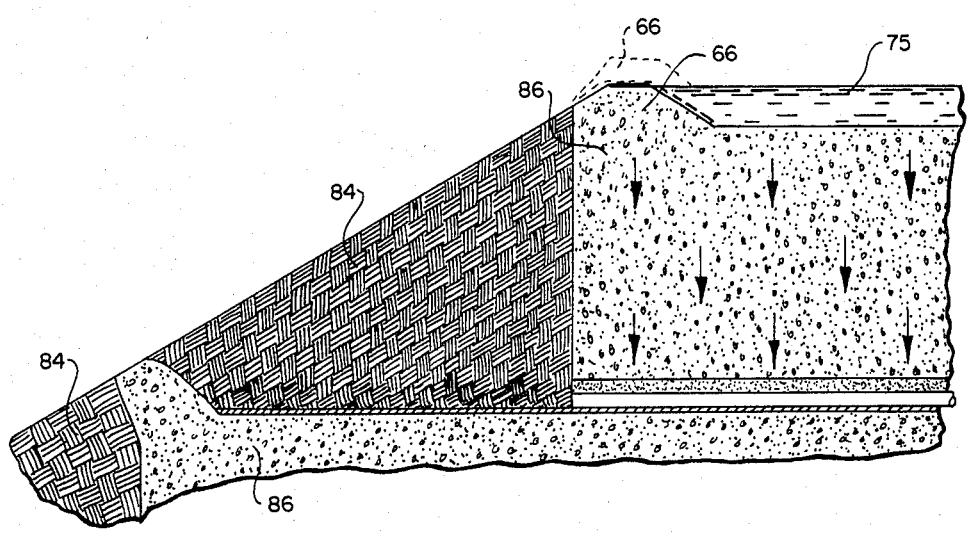
FIG. 9 is a vertical cross-sectional view of a triangular dirt dam similar to that shown in FIG. 8, but wherein a cellular heap of ore is illustrated as being leached.

As illustrated in FIGS. 8 and 9, the formation of a triangular earthen dam 84 serves to contain the ore in adjacent cell 86 without having sides which need to be leached. Also, the earthen dam provides structural integrity to the heap; this can become quite important when using the large quantities of leach solution called for in connection with the present invention wherein fine ores tend to become almost a slurry. FIG. 8 shows that dam 84 may be formed by building a pile of compacted soil at the desired location of an appropriate height and width and then removing the inner portion where the ore is to be placed; this area is outlined by a dotted line and indicated by reference numeral 88 in FIG. 8. After the excess soil has been removed, the dam will be substantially a right triangle in cross-section, with the hypotenuse serving as the outside wall of the dam and the vertical side serving as the inside wall. As best shown in FIG. 9, the ore is then loaded next to earthen dam 84 to a height at least somewhat higher than desired, because some settling will occur upon addition of the leach solution. The result of using earthen dam 84 is that even the outer cellular heaps will have substantially vertical sides.

FIGS. 8 and 9 also show that as additional layers of cells are added to the heap, additional dams are preferably constructed so as to overlie the outer edges of the outer cells of the previous layer; this construction causes the dimensions of the heap to decrease as the new cells are added over old cells. This causes the outer cells to become smaller as the heap is built, and some cells will actually disappear. The rectangle formed by dotted line 90 in FIG. 1 indicates that when the heap illustrated in FIG. 1 is completely built, it will have narrowed to the point that it will contain only eight (8) cells.

One way to partially counteract the effect of decreasing the size of the outer cells is to make the outer cells larger when first constructing the pad, such as is shown in FIG. 1.

Another approach to counteracting the effect of the decreasing sizes of outer cells is to merge one or more adjacent cells as they become too small to be commercially practical. For instance, berms 92 and 94 may be omitted so as to make two long narrow cells rather than four small cells. This latter approach, of course, would also mean that effluent obtained from the respective reservoirs of merged cells should be mixed together after collection from the respective drain lines.

Another advantage of the use of an earthen dam according to the present invention is that the dam will aid greatly in insulating the heap from freezing during cold weather. Even when heated leach solution has been added to the top of the heap in conventional installations, the sides of the heap would freeze, thus resulting in significant underleaching of the exterior portions of the heap. In the practice of the present invention, use of a dirt dam insures that no leach solution is exposed to freezing temperatures except on the surface of the heap.

Figure 10:
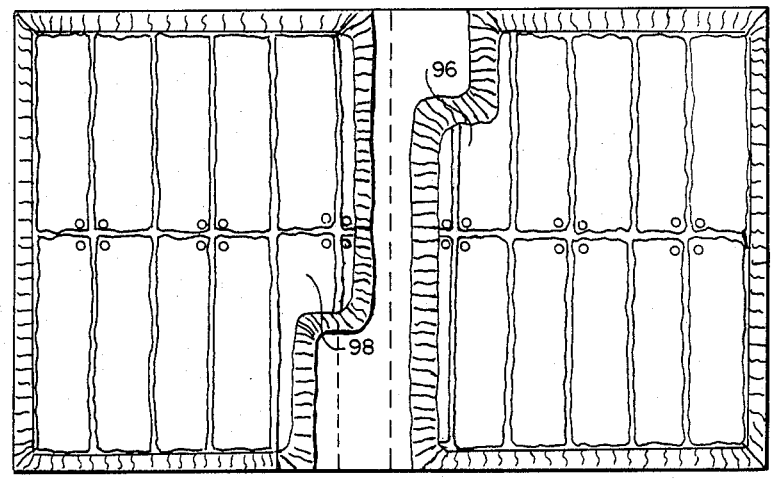
FIG. 10 is a top plan view of an alternative cellular heap leach installation within the scope of the present invention, wherein the installation is particularly suited for re-use of the pad after removing and disposing of leached ore.

Turning now to FIG. 10, this figure illustrates an alternative embodiment of a heap which is within the scope of the present invention. FIG. 10 illustrates the use of other cell shapes and patterns. The heap of FIG. 10 has the same number of cells as the heap of FIG. 1 except that it has a twelve-by-two pattern rather than the six-by-four pattern of FIG. 1; in addition, the heap of FIG. 10 has rectangular cells rather than square cells as illustrated in FIG. 1.

FIG. 10 also shows that the present invention may be practiced in connection with a re-usable pad. The heap of FIG. 10 is shown as having two areas where loading equipment is employed; cell 96 is in the process of being loaded, and cell 98 is in the process of being unloaded. Despite the requirement for double handling of the ore, this approach will sometimes be a method of choice, particularly when dealing with ores that leach quickly and have a high rate of reagent consumption after the first ten (10) to twenty (20) days. With such ores, it becomes economically undesirable to leach for extended periods of time, and it is most ecomonical to remove them to a tailings heap so that the pad may be re-used. In contrast, ores requiring long-term leaching will generally be most efficiently leached on a permanent pad of the general type described above.

From the foregoing, it will be appreciated that in accordance with the present invention, each cell may be leached independently of all of the other cells. This is extremely significant because it permits the practical use of efficient countercurrent-type leaching procedures in connection with an inexpensive heap leach process, as well as providing for a great flexibility in designing an appropriate leaching cycle. The amount of recirculation through each cell may be controlled so as to insure uniform yet intense leaching throughout the entire heap. As will be seen below, it is also possible to control the concentration of metal values in pregnant solution sent to the recovery facilities.

Figure 11:
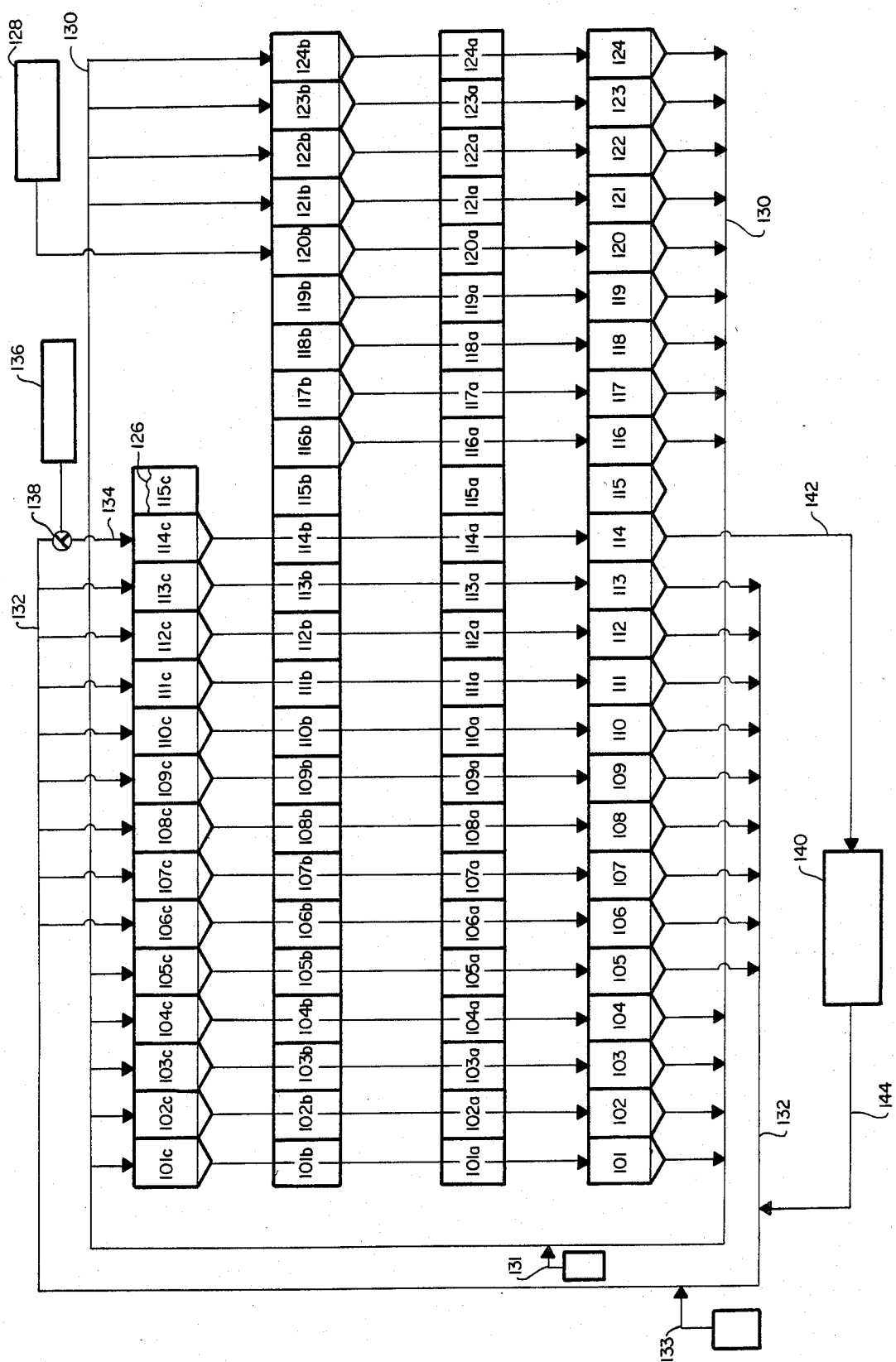
FIG. 11 is a schematical representation of one presently preferred leach regimen within the scope of the present invention for use in connection with leaching ores placed in multiple heaps.

A typical leaching cycle is illustrated by the schematic diagram of FIG. 11. The lowest level of boxes in FIG. 11, labeled with numbers 101 through 124, respectively, represent a series of 24 reservoirs from which leach solution effluent is collected after percolating through an overlying cell.

The second level of boxes, identified by a number corresponding to the respective reservoirs followed by the letter "a" represents a first layer of cellular heaps. In FIG. 11, all of the "a" layer cells have been completely leached and have been sealed off. A second layer of cells, the "b" layer, has been constructed over the "a" layer. It will be appreciated that cells 101b through 115b have also been sealed off, with yet a third layer of cells, the "c" layer, constructed thereon. (Cell 115c is shown as still in the process of being constructed, as indicated by line 126). Accordingly, cells 101c through 115c and cells 116b through 124b are the uppermost cells on the heap.

Each of the reservoirs, and most of the uppermost cells, are depicted in FIG. 11 as having triangular bottoms. Actually, this is to indicate function rather than structure and is meant to indicate that leach solution is collected at the bottom of each such reservoir and cell.

The particular leaching system illustrated in FIG. 11 comprises three different leach stages, as well as washing and drying stages. Nevertheless, it will be understood that fewer or additional leach stages may be used in any particular situation.

For convenience in understanding the method of leaching of the present invention, it is convenient to begin the description of the leach cycle by considering what is done to the oldest cells on the heap and then considering the treatment given to the newest cell. Cell 120b is shown as being washed by wash water administered from wash reservoir 128 so as to remove leach solution from the interstices of the cell. Cells 116b–119b are shown as merely draining, or "drying," in preparation for having an overlying cell added thereupon.

The third leach stage, indicated by line 130, administers a leach solution to cells 101c–105c and 121b–124b, i.e., the oldest active cells. By following line 130 in a counterclockwise direction around to the bottom, it will be appreciated that the source of leach solution for this third leach stage is reservoirs 101–104 and 116–124. Thus, it is seen that the while third leach stage solution is being recirculated through certain cells, i.e., cells 101c–104c and 121b–124b, it is also being fed by wash solution coming from cell 120b and solution draining from cells 116b–119b.

Further, it may be seen that although a portion of the third leach solution is being administered to cell 105c, reservoir 105 does not return the solution to line 130 for recirculation. Rather, reservoir 105 drains into line 132, which contains leach solution of the second leach stage. Thus, it will be appreciated that a portion of the solution from the third leach stage is "advanced" for admixture with the leach solution of the second leach stage.

Typically, the solution circulated in the third stage solution is relatively low in metal values, thus improving the tendency for the remaining metal values in the already substantially leached ore in these old cells to be solubilized. Typically, the reagent concentration in the third stage is quite low because the substantially leached ore requires only a small amount of reagent, and the use of a small amount of reagent aids in preventing overleaching where the reagent is consumed without significant accompanying leaching of metal values. Generally, only enough reagent need be added to the leach solution to insure the presence of a moderate excess of unreacted reagent in effluent solutions.

As mentioned above, the second leach stage recirculates a second leach solution through line 132. Inasmuch as this second leach stage is performed on ore that is only moderately leached and some of the third stage leach solution containing dissolved metal values is being constantly advanced to the second stage, the concentration of metal values in the second stage solution will be much higher than the third stage solution. The reagent concentration in the second leach solution is also higher than that of the third stage so as to insure the presence of excess reagent in the leach solution as it leaches the only moderately leached ore with its accompanying higher metal content.

As may be seen by reference to FIG. 11, the leach solution for the second leach stage is obtained from reservoirs 105–113. Again, it will be seen that some of this solution is continuously advanced for admixture with leach solution of the first leach stage, which is then used in leaching cell 114c, the most recently completed cell.

Cell 114c, which is fed by line 134, also receives concentrated leach solution from solution source 136. The amount of solution received from line 132 and the amount of solution received from source 136 are regulated by a valve 138. Adjustment of this valve will permit (1) selection of the appropriate mix of the two solutions so as to control the reagent concentration of the first leach solution, and (2) control of the amount of leach solution administered to cell 114c.

Preferably, the solution administered to cell 114c will have a significantly higher reagent content than the solution in line 132; this is because the ore in cell 114c is relatively unleached and thus has a very high metal value content. Increasing the reagent concentration again insures that sufficient reagent is present to maximize the solubilization of the metal values in this first leach stage.

Additionally, it is preferred that this solution be administered to the cell at a significantly slower percolation rate than is used in connection with the older active cells. This is most advantageously accomplished by using sprinkling or intermittent ponding to apply the leach solution to the top of the cell. Use of a leach solution having a high reagent content, but administered at a slow percolation rate, is very beneficial when applied to the relatively unleached ore in cell 114c. This is because the use of such a leach solution results in an effluent leach solution having an extremely high metal value concentration. This concentrating effect is further intensified because of the countercurrent-leaching approach wherein solution advanced from line 132 already contains a significant percentage of metal values. Sprinkling is also beneficial on freshly heaped ore until it has settled; pooled leach solution would tend to pass through the freshly heaped ore much too quickly.

Because effluent solution obtained from reservoir 114 is very concentrated in metal values, it is extremely efficient to recover those metal values. It has been found that the above-described method can provide leach solutions containing metal values in concentrations of five (5) to twenty (20) times higher than that obtainable from conventional processes; in fact, it is even possible to obtain metal value concentrations higher than the metal value concentration in the ore.

It has been found that practice of the present invention results in the production of about 0.2–1.0 tons of pregnant solution per ton of ore; this is in contrast to the 1.0–5.0 tons of pregnant solution per ton of ore generally utilized in conventional processes. The more concentrated leach solution effluent obtained from practicing the present invention makes possible the use of many inexpensive recovery processes which may be inefficient when used with the less concentrated effluent solutions obtained by conventional leach processes. The result is an improvement in the efficiency of conventional recovery processes with corresponding economical savings.

For instance, effluent leach solutions from conventional heap leach operations will load onto activated charcoal at the rate of about 150–250 ounces of precious metals per ton of charcoal. In contrast, the more concentrated effluent solution obtained in accordance with the present invention will load activated charcoal up to 500 to 1000 ounces of precious metals per ton of charcoal. This greatly reduces the size, as well as both the operating and construction costs, of the metal recovery system.

Additionally, the high degree of recirculation will permit the design of a small recovery plant designed to remove only an easily removed proportion of the precious metals from the final effluent leach solution, since the metal values not recovered will be returned to the system rather than being discarded and lost. This permits even more economical operation of the recovery plant.

Accordingly, effluent from reservoir 114 is sent to a recovery facility 140 through line 142, wherein the desirable metal values and the undesirable contaminants are removed. Barren or relatively barren leach solution having a relatively high reagent concentration is then returned to the system by means of line 144, which feeds into line 132 of the second leach cycle. Additional reagent may also be added to the system, as needed, through lines 131 and 133, respectively or by addition into appropriate standpipes of one or more cells.

One feature of the large amount of recycling employed in this leach system is that tremendous volumes of leach solution are passed through the ore, yet the leach solution is not diluted. In practicing the present invention, it will be common to pass from five (5) to thirty (30) tons of leach solution through each ton of ore during the course of the leach cycle. This results in very uniform leaching throughout the cellular heap. In contrast, conventional heap leach processes typically pass only about one (1) to three (3) tons of leach solution through each ton of ore.

It will be appreciated that the foregoing leach system insures a relatively constant supply of concentrated effluent solution to the recovery facility. As a result, the recovery facility may be continuously operated at full capacity, thereby avoiding the useless tie-up of capital often encountered in conventional systems stemming from the need to design the recovery facility large enough to accommodate initially rich leach solutions, even though this means that such a recovery facility is over-sized for recovery of metal values from the later more dilute solutions.

Another advantage of the approach of the present invention becomes apparent during winter-time operation. As mentioned above, leach solution is preferably administered to the newest active cell at a relatively slow percolation rate by means of intermittent ponding or sprinkling. In either case, the newest active cell is more subject to freezing than are the other cells that are subjected to continuous pooling. However, the leach solution used in connection with the newest active cell is quite high in reagent and metal values, and this high salt content significantly reduces the tendency of the leach solution to freeze.

Figure 12:
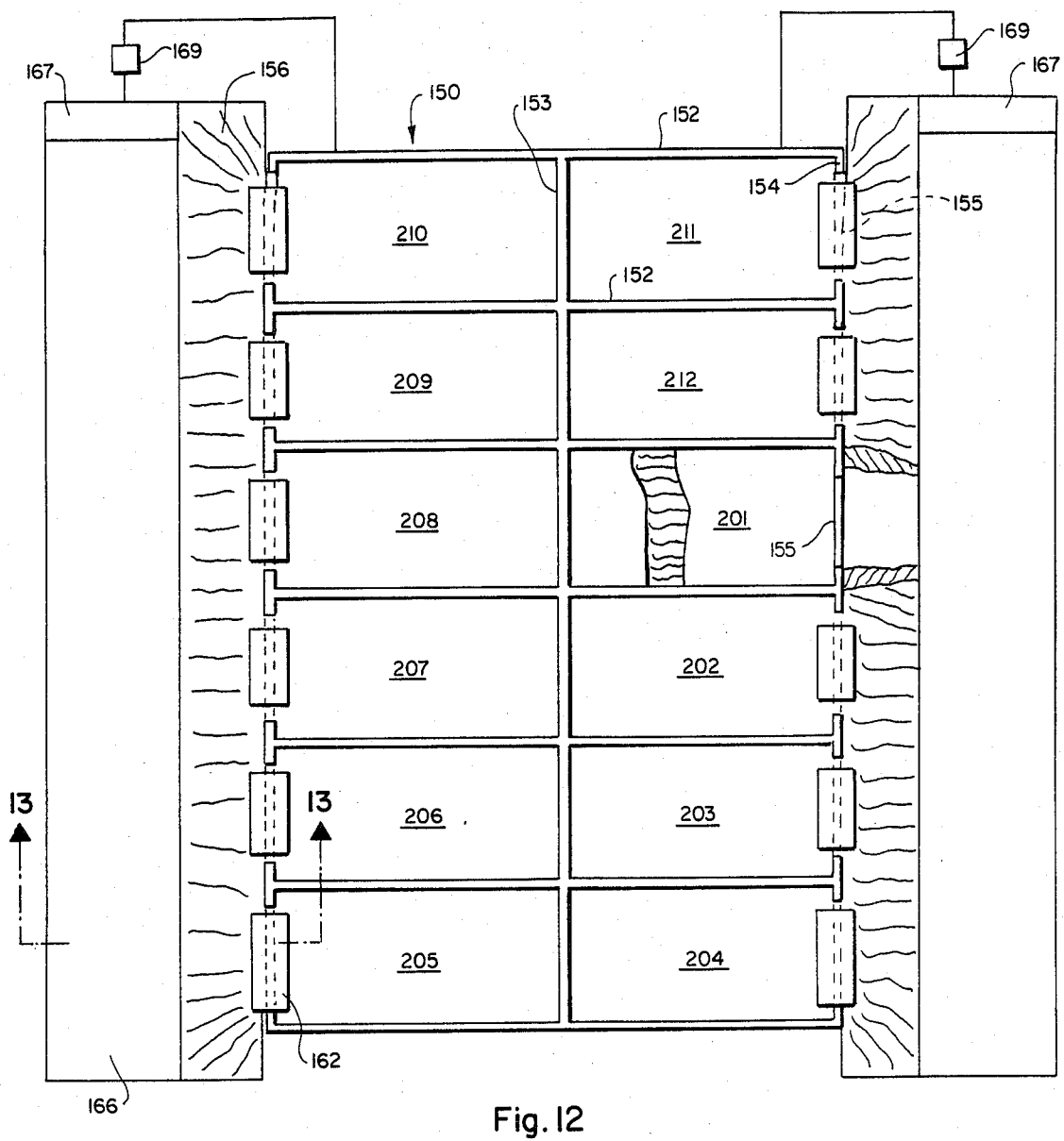
FIG. 12 is a top plan view of a third embodiment of a cellular heap leach installation within the scope of the present invention, wherein the various cells are physically separated by walls.
Figure 13:
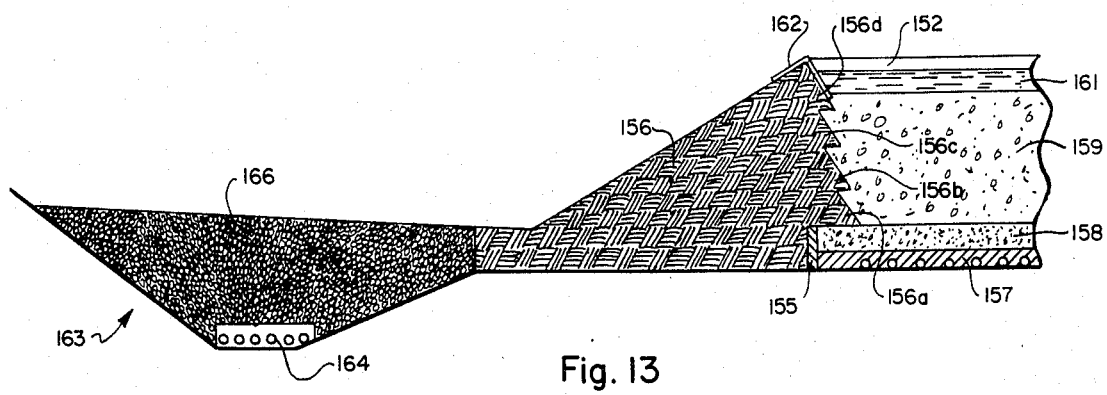
FIG. 13 is a vertical sectional view taken along the line 13—13 of FIG. 12, and drawn to an enlarged scale, in which the construction of a spill collection system within the scope of the present invention is illustrated.

A third embodiment of the present invention is illustrated in FIGS. 12 and 13. This embodiment may be advantageously constructed in the manner illustrated in FIG. 12, wherein a series of compartments 150 are formed having permanent side walls 152, end wall 153, and open or partially open wall 154; open wall 154 is preferably wide enough to permit entry of equipment for removing ore tailings after completion of the leach cycle. However, in order to provide support and structural integrity to the effluent recovery system, it is preferred that a low wall 155 extend between the open ends of open wall 154.

Unlike the earlier illustrated embodiments, wherein berms were used to form shallow compartments over which ore is loaded, the walls of the embodiment of FIG. 12 are slightly higher than the height to which the ore will be stacked so as to physically separate adjacent cells and also to allow pooling of leach solution within the confines of the walls. The open or partially open end of each cell is closed off by a temporary earthen dam 156. Preferably, this dam is built in stages as ore is loaded into the cellular compartment so that ore 159 will provide support for the inside wall dam, yet will not unduly fill the cell with soil. FIG. 13 illustrates an earthen dam built in four stages; reference numerals 156a, 156b, 156c, and 156d indicate that by building the dam in stages there is a minimum intrusion of dam material into the interior of the cell. The top portion of the earthen dam which extends across the open end of the cell is preferably covered with burlap or plastic sheeting 162 to minimize erosion and to assist in containing ponded leach solution 161.

The bottom of each cell is advantageously provided with an effluent recovery system, shown generally as 157, similar in configuration to that shown in FIGS. 3 and 4. Nevertheless, it will be appreciated that there is normally no need for a vertical standpipe since only a single cellular layer will generally be used.

An important advantage of the embodiment of FIG. 12 is its ability to leach ores that are delivered to the leach site in the form of a slurry, since the high walls provide structural integrity for the various cells. When an ore slurry is loaded into one of these cells, excess water is advantageously removed from the top of the heap by decanting pooled water, in addition to collecting water in the normal manner from the effluent system.

In order to prevent damage to the effluent system, it is preferred that a porous sand layer 158 (see FIG. 13) be placed over the effluent system before adding ore to the cell. This porous sand layer is equivalent to porous layer 54 shown in FIG. 3. A portion of this porous layer may then be removed along with the ore tailings without disturbing the underlying effluent collection system. The porous sand layer may then be rebuilt to its desired thickness prior to refilling the cell with additional ore.

In FIG. 12, the cellular heap system comprises twelve compartmentalized cells, with cell 201 being shown in the process of being unloaded, and neighboring cell 202 in the process of being loaded. A preferred leach cycle for this embodiment is similar to the earlier-described leach cycle. Thus, cell 203 is the most recently loaded active cell, and is advantageously undergoing first stage leaching. Cells 204 through 207 are advantageously in the second leach stage and cells 208 through 211 are in the third leach stage. Cell 212 is advantageously being rinsed and drained in preparation for unloading and removal of the ore to a tailings heap. As set forth above, it is preferred that the rinse water and the leach solutions of each respective leach be highly recirculated, with portions thereof being advanced in countercurrent fashion and the effluent of the first leach stage cell being sent to a metal recovery plant for treatment. It is anticipated that the leach cycle will be designed to complete leaching of the ore within about one month in order to make this embodiment economical.

As mentioned, the embodiment of FIG. 12 is particularly useful for leaching ores delivered to the system in the form of a slurry. Preferably, such ores should be relatively free of fine slimes so that there will be adequate downward percolation in order to permit adequate recirculation and a high level of metal recovery within a reasonable period of time. Nevertheless, ores containing significant amounts of fine slimes may be leached by this system by adding cement to the slurry and allowing a quiescent cure period of one or two days after loading before commencing the leaching cycle. Of course, the ores may also be treated so as to remove slimes prior to loading the cells.

Although many different ores could be leached in a leach system patterned after that illustrated in FIG. 12, this system would be particularly useful for leaching slurries of tailings from a flotation mill or mill tailings from a tailings pond of ore obtained by a hydraulic mining method. This type of heap would also be well-suited for treatment of sized, wet-separated permeable sand fractions obtained from placer operations. Of course, many other ores may also be leached in this type of leach system, although long-leaching ores would best be leached in the manner set forth above in connection with FIGS. 1 through 10.

An additional feature incorporated into the third embodiment, best seen in FIG. 13, is the use of a spill collection system 163 along the length of earthen dams 156. This spill collection system provides additional security against escape of leach solution into the environment in the event the earthen dam should give way, or in the event the leach solution should otherwise escape from the individual cells. Such a spill collection system may be advantageously formed by digging a trench along or around the leach system, laying a plurality of perforated collection pipes 164 along the bottom of the trench, and filling the trench with a porous material 166 (such as coarse sand or rock). It would also be desirable to provide a sump 167 and pump 169. Although such a spill collection system may be used in connection with any leach system, it will be readily appreciated that it is especially beneficial when used in connection with a leach system wherein ore slurries are leached because of the extra amount of liquids used in such systems.

The following illustrative examples are helpful in understanding how the foregoing may be utilized in an actual cellular heap leach system.

EXAMPLE I

A heap leach system containing gold and silver ore is constructed in accordance with the foregoing description and then treated according to the following schedule. In order to bring and maintain the pH of a cyanide leach solution at a value between about 9 and 11, lime is advantageously intermixed with the ore prior to or during the loading step.

The newly formed active cell is first treated for about one to four days by sprinkling or intermittently ponding a leach solution containing a relatively high concentration of NaCN (approximately 0.2 to 2.5 grams of NaCN per liter of leach solution) so that the solution will percolate through the ore at a rate of about 0.25 to 1.0 gallons of leach solution per hour per square foot of the cellular heap surface. This solution is removed from the bottom of the heap and sent to the recovery facility for recovery of the precious metals and removal of contaminants. The barren leach solution is then returned to the leach system for reuse.

During the time that the first active cell is being leached, a second cell is in the process of being constructed.

After a period of one to four days, most of the metal values of ore in the first cellular heap will be recovered, and a second leach stage is initiated. Thus, for a period of about 15–60 days, the first cellular heap is subjected to leaching by recirculating a second leach stage leach solution having a reagent concentration of about 0.3 grams of NaCN per liter of solution. This leach solution is ponded on the surface of the cellular heap so that it will percolate through the cellular heap at a rate of about 0.25 to 2.0 gallons of solution per hour per square foot.

Simultaneously, the second cell undergoes the one to four day initial leach stage and then enters the second leach stage, and additional cells are also formed. Accordingly, as new cells are constructed, each cell undergoes the same treatment regimen as the previous cell, but the treatment regimen is staggered in time by one to four days depending upon the length of time of the first leach stage.

After completion of the second leach stage, each cell is subjected to a third leach stage, wherein for a period of 15-60 days, a leach solution having a reagent concentration of about 0.05 to 0.1 grams of NaCN per liter of solution is recirculated through the cell.

As more and more cells are added, there are soon a number of cells undergoing the second and third leach stages. The recirculating leach solution from cells in the third stage are freely intermixed, but about 5-20% of the solution is continuously advanced for mixing with leach solution of the second stage. Extra reagent is added as needed to insure the presence of excess free cyanide at all times.

Similarly, the leach solution from each of the cells in the second stage is freely intermixed, and about 5-20% of the second stage solution is continuously advanced to the first stage. Again, extra reagent is added as needed.

After each cell completes the third leach stage, it is washed with water to displace leach solution contained interstitially, and then the cell is allowed to dry sufficiently that it can bear the weight of loading equipment. Each such cell is then sealed off, and a new overlying cell is constructed.

EXAMPLE II

A heap leach system containing relatively quick-leaching gold and silver ore is constructed on a re-usable pad constructed in accordance with the foregoing description so as to permit removal of leach solution from individual cellular heaps. Concurrently with the construction of a new active cell on one portion of the re-usable pad, the oldest cellular heap on the pad is removed, and the substantially leached ore is placed on a tailings heap.

After a new active cell is formed, it is treated for one (1) to two (2) days by sprinkling or intermittent ponding with leach solution containing a relatively high concentration of NaCN in a manner similar to that set forth in connection with Example I.

After completion of the first leach stage, the cell is subjected to a second leach stage and then a third leach stage, each lasting for about 6-20 days. Thus, the total length of time that a particular cell is leached is about 15-44 days. The cell is then rinsed for about one to two days with water, allowed to drain for another 1-2 days, and then removed to a tailings heap.

EXAMPLE III

A series of compartments having permanent side walls and a permanent end wall is constructed on a pad with the walls having a height sufficient to enclose and physically separate ore placed therein from ore in adjacent compartments. Advantageously, so that end walls and side walls may be shared between adjacent compartments to the maximum extent, the compartments are constructed in a matrix two compartments wide and any appropriate number of compartments long. The width of each compartment is wide enough to permit easy unloading of ore after completion of the leaching process.

The front end of each cell is advantageously closed off by placement of an earthen dam, and each cell is filled on a staggered basis with ore or a slurry of ore. The individual cellular heaps are then subjected to leaching in the manner set forth in connection with Examples I and II. After the ore has been leached to the desired extent, it is removed and placed on a tailings heap.

The following illustrative examples are helpful in understanding how various parameters (such as percolation rate, reagent concentration, and leach times) affect the efficiency of the present invention. These examples further illustrate how laboratory tests may be used to determine the optimum parameters for use wih any particular ore.

EXAMPLE IV

Old silver-lead-zinc flotation mill tailings, found by assay to contain about 1.67 ounces of silver per ton of ore, were leached according to the present invention. This ore, which had been ground so that 80% of the ore particles were less than 100 mesh in size, was cement-agglomerated by the addition of about 7 pounds of portland cement and 2 pounds of slaked lime (CaO) per ton of ore at a total moisture content of about 12% (weight percent), and then cured by setting in a closed container for 24 hours. The cured ore was then placed into a 3.166 inch diameter column 8.5 feet in height and leached with a sodium cyanide ("NaCN") leach solution wherein the concentration of cyanide was maintained throughout the leaching cycle between about 0.1 and 0.5 grams per liter, such that free cyanide was continuously emitted in the effluent solution. The pH of the effluent was maintained between about nine and about eleven throughout the period of leaching. Periodically, a sample of the leach solution was withdrawn and assayed. The results of these assays are shown in Table 1 below.

TABLE 1

| Cumulative leach period (days) | Cumulative Silver Recovery (%) | Cumulative NaCN Consumption (pounds per ton of ore) |
|---|---|---|
| 1 | 26.3 | — |
| 2 | 76.1 | — |
| 3 | 83.4 | 0.70 |
| 29 | 89.4 | 0.89 |

From the results of these assays, it may be seen that a substantial percentage of the silver is recovered within only a few days. Nevertheless, significant amounts of silver may still be recovered after additional leaching. The actual period of leaching to be used in connection with any particular ore will be determined on the basis of economics; leaching will be advantageously continued until the point where the costs of continued leaching approach or exceed the value of metal recovered. It should be noted that the amount of NaCN consumed in this test was extremely low in comparison with traditional processes. For instance, in agitation leach tests performed on this ore, it was found that about 2-7 pounds of NaCN were required per ton of ore to recover about 69-80% of the silver. Accordingly, it will be appreciated that the costs of leaching ore in accordance with the present invention are dramatically reduced in comparison to the costs of agitation leaching.

EXAMPLE V

Using the same general procedures and column described in connection with Example IV, old gold stamp mill tailings were leached. Essentially, all of the ore particles of these tailings (98%) were below 65 mesh in size, and they were found by assay to contain about 0.12 ounces of gold and about 0.9 ounces of silver per ton of ore. Again, the sample was cement-agglomerated prior to placement in the column; this was accomplished by adding 10 pounds of portland cement and 1 pound of lime per ton of ore at a moisture content of 10% and a 24-hour cure period.

The results of assays taken at various intervals are shown in Table 2 below:

TABLE 2

| Cumulative Leach Period (days) | Cumulative Gold Recovery (%) | Cumulative NaCN Consumption (pounds per ton of ore) |
|---|---|---|
| 4 | 74.0 | 0.51 |
| 10 | 86.4 | 0.60 |
| 30 | 87.6 | 0.66 |
| 43 | 88.3 | 0.77 |
| 57 | 88.9 | 1.00 |

It was discovered that about 66% of the silver was also recovered, and the effluent was also found to contain significant amounts of copper and mercury.

Again, exceptional percentages of gold recovery were recovered after less than two months leaching, and at extremely low rates of sodium cyanide consumption. As noted in connection with Example V, this example also illustrates that a substantial percentage of the recovery will be accomplished within the first few days of leaching.

EXAMPLE VI

The apparatus and procedures of Example IV were used on a cement-agglomerated sample of an old silver-lead-zinc flotation tailing containing 4.25 ounces of silver and 0.022 ounces of gold per ton of ore, and about 2% lead and 3% zinc. Before agglomeration, approximately 58% of the ore particles had a particle size of less than 100 mesh. Agglomeration was accomplished by adding 15 pounds of portland cement and 3 pounds of lime per ton of ore at a total moisture content of 12%. The results are reported in Table 3.

TABLE 3

| Cumulative leach period (days) | Cumulative Silver Recovery (%) | Cumulative NaCN Consumption (pounds per ton of ore) |
|---|---|---|
| 4 | 76 | 6.85 |
| 40 | 79 | 7.20 |
| 64 | 82 | 9.14 |

After 64 days of leaching, it was determined that 91% of the assayed amount of gold in the ore had also been recovered. Unusually large amounts of cyanide were consumed because of the high levels of zinc, lead and copper also present in the ore. Further, the substantial increase of consumption of cyanide with only a moderate additional recovery of silver between day 40 and day 60 indicate that it is uneconomical to continue leaching of this ore much beyond about 40 days.

Although the NaCN consumption was much higher in connection with this ore than with the ores of Examples IV and V, a comparative test on this ore using agitation leaching consumed about 11 pounds of NaCN per ton of ore in recovering about 69% of the silver and 67% of the gold.

EXAMPLE VII

The apparatus and procedures of Example IV were used on an old cyanide leach tailing containing 0.0425 ounces of gold per ton of ore. Approximately 71% of the ore particles had a particle size of less than 100 mesh. In this example, the ore was only partially agglomerated with portland cement prior to leaching; only 7 pounds of cement was added per ton of ore (together with 2 pounds of lime at a 12% moisture content). About 15 pounds of cement should have been used per ton of this ore. The results are reported in Table 4.

TABLE 4

| Cumulative Leach Period (days) | Cumulative Gold Recovery (%) | Cumulative NaCN Consumption (pounds per ton of ore) |
|---|---|---|
| 3 | 49.8 | 0.20 |
| 19 | 51.9 | 0.44 |
| 33 | 52.9 | 0.50 |

It can be seen from these results that inadequate agglomeration significantly reduces the efficiency of the process. Thus, it is desirable to make sure that ore placed in cellular heaps is adequately agglomerated prior to leaching.

A comparative agitation leach on this ore resulted in a gold recovery of 53.8% with a consumption of about 0.88 pounds of NaCN per ton of ore, indicating again the economy and efficiency in terms of reagent use of the heap leaching of an agglomerated ore.

EXAMPLES VIII & IX

These examples illustrate the effect of size and agglomeration on the efficiency of the process of the present invention. The apparatus and procedures of Example IV were used on a newly-mined, crushed ore from a major heap leach operation. In Example VIII a run-of-heap ore (crushed to less than ½ in size) without cement-agglomeration was used, although lime was added at the rate of about 2 pounds of lime per ton of ore. The ore of Example IX was further reduced so as to comprise particles less than ¼ inch in size; this ore was further subjected to cement-agglomeration prior to leaching by the addition of 5 pounds of portland cement and 2 pounds of lime per ton of ore. The results of Example VIII are reported in Table 5, while the results of Example IX are shown in Table 6.

TABLE 5

| Cumulative Leach Period (days) | Cumulative Gold Recovery (%) | Cumulative NaCN Consumption (pounds per ton of ore) |
|---|---|---|
| 4 | 48.1 | 0.16 |
| 15 | 59.6 | 0.90 |
| 30 | 63.3 | 1.41 |
| 43 | 65.3 | 1.63 |
| 78 | 66.1 | 2.06 |
| 86 | 66.7 | 2.19 |

TABLE 6

| Cumulative Leach Period (days) | Cumulative Gold Recovery (%) | Cumulative NaCN Consumption (pounds per ton of ore) |
|---|---|---|
| 86 | 69.9 | 1.53 |

The results reported in these two tables indicated clearly that smaller cement-agglomerated particles are more efficiently leached than larger run-of-heap ore.

EXAMPLE X

The apparatus and procedures in Example IV was performed on newly-mined gold ore from a current "reusable pad" heap leaching operation. This ore, which contained about 0.031 ounces of gold per ton of ore, was prepared by adding lime at the rate of 1.5 pounds per ton of ore, taking the run-of-heap material comprised of ore particles less than one inch in size, screening it to separate all particles less than 3/8 inch, and layering the fine particles on top of the larger particles so as to reduce the maximum percolation rates through the heap to about 3 gallons of leach solution per hour per square foot of heap. The results are indicated in Table 7.

TABLE 7

| Cumulative Leach Period (days) | Cumulative Gold Recovery (%) | Cumulative NaCN Consumption (pounds per ton of ore) |
|---|---|---|
| 3 | 66.6 | 0.44 |
| 12 | 71.7 | 0.90 |
| 18 | 76.5 | 1.18 |
| 49 | 79.8 | 2.19 |

By way of comparison, the gold recoveries reported by the heap leach operation from which this ore was obtained were only about 70-75% after 30 days of leaching. Further, these figures reported by the heap leach operation were obtained from leaching of higher-grade ores than the particular ore used in performing this test. This clearly demonstrates the much greater efficiency of the process of the present invention.

EXAMPLE XI

The apparatus and procedures of Example IV were used on an unagglomerated, newly-mined ore obtained from a "reusable pad" type heap leach operation. This ore, which contained about 0.05 ounces of gold per ton of ore, was leached at a percolation rate of about 1.5 gallons of leach solution per hour per square foot of heap. Again, about 1.5 pounds of lime were added per ton of ore. The results are described in Table 8.

TABLE 8

| Cumulative Leach Period (days) | Cumulative Gold Recovery (%) | Cumulative NaCN Consumption (pounds per ton of ore) |
|---|---|---|
| 4 | 38.0 | 0.14 |
| 15 | 60.1 | 0.47 |
| 30 | 67.2 | 0.65 |
| 43 | 71.5 | 1.39 |
| 75 | 79.4 | 2.29 |
| 96 | 81.4 | 2.79 |

These results show that not all ores are effectively leached in the shorter periods reported in connection with some of the other examples. For the data shown in Table 8, it would be advantageous to conduct a first leach stage for about 6 days, a second leach stage for about 45 days and a third leach stage for about 45 days.

EXAMPLE XII

The apparatus and procedures of Example IV were used on an old, partially oxidized, mine dump material containing about 4.25 ounces of silver per ton of ore, and comprised principally of particles less than 3/4 inches in size. Results of leaching this ore after cement-agglomeration are reported in Table 9. In this example, about 7 pounds of portland cement and 1.5 pounds of lime were added per ton of ore at a 10% moisture content.

TABLE 9

| Cumulative leach period (days) | Cumulative Silver Recovery (%) | Cumulative NaCN Consumption (pounds per ton of ore) |
|---|---|---|
| 32 | 51.8 | 1.92 |
| 135 | 64.0 | 5.24 |

Again, this ore is very slow-leaching. Such ores would be quite uneconomical to leach by agitation methods, but remain practical for use in the practice of the present invention.

EXAMPLE XIII

The apparatus and procedures of Example IV were used on a very hard, newly-mined gold ore that had been crushed to less than about 1/4 inch in size, and then cement-agglomerated (7 pounds of portland cement and 1.5 pounds of lime per ton of ore at 8% moisture content). The results are reported in Table 10.

TABLE 10

| Cumulative Leach Period (days) | Cumulative Gold Recovery (%) | Cumulative NaCN Consumption (pounds per ton of ore) |
|---|---|---|
| 4 | 46.6 | 0.26 |
| 15 | 51.0 | 0.74 |
| 33 | 55.4 | 2.43 |
| 87 | 56.7 | 3.27 |

This ore is presently being commercially leached in an agitation leach plant. Current gold recoveries in the agitation plant are about 80%, but at an extremely high operating cost. Further, in order to get that recovery, the ore was reduced to the point where 90% of the ore particles were less than 200 mesh in size. Despite the fact that the recovery reported in Table 10 is less than the recovery reported by the agitation leach plant, the lower costs of operation make the process of the present invention competitive with agitation leaching.

EXAMPLE XIV

The apparatus and procedures of Example IV were used on a clayey gold ore that was crushed to a particle size of less than 1/4 inch and then cement-agglomerated (10 pounds of portland cement and 2 pounds of lime per ton of ore at a 10% moisture content). The results are reported in Table 11.

TABLE 11

| Cumulative Leach Period (days) | Cumulative Gold Recovery (%) | Cumulative NaCN Consumption (pounds per ton of ore) |
|---|---|---|
| 3 | 78.5 | 0.31 |
| 17 | 82.0 | 1.45 |
| 25 | 83.5 | 2.47 |

Again, this ore is currently being treated by agitation leaching on a commercial basis. Commercial agitation leach recoveries are reported to be in the 85-90% range, with NaCN consumptions of about 4 pounds of reagent per ton of ore. However, as seen in Table 11, the recovery reported in connection with this example is nearly as good as that reported by the agitation leach plant. Because the ore used in the agitation leach plant had to be reduced to a particle size of about 100 mesh or less, and because of the increased handling and capital equipment necessary for an agitation process, the process of the present invention would significantly increase profit in leaching the ore of this example.

From the foregoing examples, it will be appreciated that tests run on any particular ore will provide one of ordinary skill in the art with the information needed to determine how long a particular ore should be leached to obtain the maximum economic recovery of precious metals. By knowing the leaching rate of the particular ore, it is a relatively simple matter to design the optimum size, depth, and number of cells needed to maintain a particular recovery plant at full capacity. Such tests will also give information useful in determing how long to operate each leach stage, and what pre-treatment of the ore is needed. For instance, it is seen from the foregoing examples that finely divided, cement-agglomerated ores are more efficiently leached then ores having larger, unagglomerated particles.

The following examples illustrate the usefulness of the present invention in connection with the leaching of ores other than gold and silver ores and illustrate the flexibility available in the practice of the present invention.

EXAMPLE XV

A copper ore selected from the class of oxide ores, oxide-sulfide ores, or sulfide ores (principally chalcocite mineralization) or a uranium ore with oxide or primary mineralization is crushed to a particle size below ½ inch and loaded into a cellular heap in accordance with the foregoing description to a height of about 10 feet.

The ore is initially leached for a period of about 3-6 days with a sulfuric acid or sulfuric acid-ferric acid sulfate solution (elgl, a recirculated solution obtained after metal recovery) having about 10-50 grams per liter of $H_2SO_4$ and 2-5 grams per liter of $Fe^{+3}$ so as to recover about 20-40% of the metal values. Thereafter, the ore is leached for up to about 120 days with a leach solution containing about 5-10 grams per liter $H_2SO_4$ and 1-5 grams per liter of $Fe^{+3}$ until about 70-95% of the metals have been recovered. Leaching is continued until the costs of reagents consumed and costs of operation approach the value of the metal recovered.

This process results in the production of a pregnant leach solution having near-saturation levels of metal values, greatly facilitating metal recovery operations from the leach solution.

EXAMPLE XVI

In this example, the ore of Example XV is subjected to an acid-cure step prior to leaching. Acid curing is achieved by mixing about 60% to 80% of the total acid requirements of the ore in the form of a concentrated or strong solution of sulfuric acid (e.g., a 20%-80% solution of sulfuric acid) at ambient temperature so as to wet the crushed ore with a 10% to 13% (weight percent) solution, and allowing the ore to cure for about 8-24 hours before leaching in the manner set forth in Example XV. The advantage of the acid-cure step is that about 40% to 70% of the metal values will be recovered within the first 3 to 5 days and a total recovery of 70-95% is attained after a total leach period of only about 15-80 days. The shorter leach period makes feasible the use of any of the described embodiments of cellular heap leaching.

From the foregoing description and examples, it will be appreciated that the present invention is significantly more efficient than conventional heap leach systems, and is even comparable with agitation leaching under proper conditions. Unlike conventional heap leach processes, the present invention allows great uniformity of leaching and is thus capable of economically recovering much greater percentages of metal values from the ore. Yet, the present invention is capable of handling the large volume of ore generally processed in heap leach systems, and it does so at a cost significantly lower than if agitation leaching were to be employed. Although shallow heaps are individually leached, the ability to stack one cellular heap on top of another avoids the need for multiple handling of the ore and prevents the need for an excessive number of pads. By a proper combination of crushing or grinding and agglomeration, virtually any ore may be effectively leached in connection with the present invention.

As noted above, the present invention also results in continuous output of leach solution having an exceedingly high metal value concentration. This substantially increases the efficiency of recovery operations and permits substantially full use of the recovery plant capacity. The concentrated leach solutions are also significantly less prone to freezing in frigid conditions.

The use of the novel earthen dam described above further protects the heap from freezing by insulating the periphery of the heap. Most importantly, however, the dam eliminates the presence of ore sides that must be leached; this avoids one of the most inefficient aspects of conventional heap leach systems, as well as the problem of how to avoid side-erosion or structural failure of the heap.

The present invention is also extremely advantageous from an environmental perspective. Not only does the pad construction provide for protection against ground leakage, but use of pooling avoids wind-carried losses of leach solution. The recirculation of leach solution avoids problems of disposal of waste leach solution.

It will be appreciated that the present invention may be embodied in other specific forms without departing from its spirit or essential characteristics. The foregoing descriptions are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by U.S. Letters Patent is:

1. A heap leach system for leaching metal values from ores comprising:
   an impermeable pad having a plurality of reservoirs formed on said pad, said reservoirs being capable of ore placed upon said pad for leaching, said ore comprising a plurality of separately identifiable cellular heaps by reference to the respective reservoirs on the pad, said cellular heaps further being arranged in layers, with substantially unleached cellular heaps placed so as to overlie substantially leached cellular heaps, said overlying heaps being separated from underlying cellular heaps by an impermeable material so that leaching of overlying cellular heaps can be performed independently of leaching of respective underlying cellular heaps;
   means for introducing leach solution onto the surface of each substantially unleached cellular heap independently of other cellular heaps;

means for collecting leach solution from each cellular heap into its respective underlying reservoir independently of other cellular heaps; and means for removing leach solution from each of said reservoirs independently of the other reservoirs.

2. A heap leach system for leaching metal values from ores as defined in claim 1 wherein the plurality of reservoirs are configured by a plurality of berms arranged in a grid network.

3. A heap leach system for leaching metal values from ores as defined in claim 1 further comprising berms formed on the upper surface of the cellular heaps at positions corresponding to the sidewalls of the underlying reservoirs.

4. A heap leach system for leaching metal values from ores as defined in claim 1 wherein the reservoirs contain a permeable material, and the ore heaps are placed upon said permeable material.

5. A heap leach system for leaching metal values from ores as defined in claim 4 wherein the permeable material is coarse sand and rock.

6. A heap leach system for leaching metal values from ores as defined in claim 1 wherein the means for removing the leach solution from each of said reservoirs comprises:

a plurality of perforated pipes placed horizontally at the base of each respective reservoir so as to collect the leach solution;

a collection pipe, connected to said plurality of perforated pipes, for collecting the leach solution from the perforated pipes in the reservoirs; and means for removing the leach solution from the collection pipe.

7. A heap leach system for leaching metal values from ores as defined in claim 6 wherein the means for draining leach solution from each cellular heap into the respective underlying reservoir comprises:

a leach solution recovery system for each cellular heap which is separated from the respective underlying reservoir by underlying cellular heaps, said leach solution recovery system being comprised of a plurality of perforated pipes placed horizontally at the base of its respective cellular heap so as to collect leach solution passing therethrough;

a collection pipe, connected to said plurality of perforated pipes, for collecting the leach solution from said perforated pipes; and means for transporting the leach solution from the collection pipe to the underlying reservoir.

8. A heap leach system for leaching metal values from ores as defined in claim 7 wherein the means for removing the leach solution from the collection pipe comprises a vertical standpipe.

9. A heap leach system for leaching metal values from ores as defined in claim 8 wherein the vertical standpipe communicates with the base of the reservoir with which it is associated.

10. A heap leach system for leaching metal values from ores as defined in claim 1 wherein the exterior sides of exterior cellular heaps are retained by an earthen dam, said dam being configured substantially as a right triangle in vertical cross-section such that a vertical side serves as an inside wall of the earthen dam against which contingous cellular heaps are supported and the hypotenuse serves as the outside wall of the earthen dam.

11. A heap leach system for leaching metal values from ore as defined in claim 1 wherein the impermeable pad upon which the plurality of heaps are placed comprises:

a first impermeable barrier onto which the ore heaps are placed for leaching; and a monitor system underlying said first impermeable barrier to detect leaks in said first barrier, said monitor system including a plurality of reservoirs corresponding to the reservoirs formed on the pad, said monitor system further including a perforated monitor pipe in each reservoir of the monitor system and communicating with the exterior of the pad.

12. A heap leach system for leaching metal values from ore as defined in claim 11 wherein the impermeable pad further comprises a second impermeable barrier underlying the monitor system and capable of preventing leach solution from draining into the environment in the event of a leak in the first impermeable barrier until the first impermeable barrier can be repaired.

* * * * *

UNITED STATES PATENT AND TRADEMARK OFFICE
CERTIFICATE OF CORRECTION

PATENT NO. : 4,526,615

DATED : July 2, 1985

INVENTOR(S) : PAUL H. JOHNSON

It is certified that error appears in the above-identified patent and that said Letters Patent is hereby corrected as shown below:

Abstract, line 13, "where" should be --whence--
    Column 26, line 54, after "of," --collecting leach solution;-- should be added

Signed and Sealed this

Fifteenth Day of October 1985

[SEAL]

Attest:

Attesting Officer

DONALD J. QUIGG

Commissioner of Patents and Trademarks—Designate